(12) United States Patent
Chhabra et al.

(10) Patent No.: US 11,385,071 B2
(45) Date of Patent: Jul. 12, 2022

(54) PROVIDING A ROUTE WITH AUGMENTED REALITY

(71) Applicant: Micron Technology, Inc., Boise, ID (US)

(72) Inventors: Bhumika Chhabra, Boise, ID (US); Radhika Viswanathan, Boise, ID (US); Carla L. Christensen, Boise, ID (US); Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/988,414

(22) Filed: Aug. 7, 2020

(65) Prior Publication Data

US 2022/0042816 A1 Feb. 10, 2022

(51) Int. Cl.
*G01C 21/18* (2006.01)
*G01C 21/36* (2006.01)
*G06T 19/00* (2011.01)

(52) U.S. Cl.
CPC ......... *G01C 21/3635* (2013.01); *G01C 21/18* (2013.01); *G01C 21/3667* (2013.01); *G06T 19/003* (2013.01)

(58) Field of Classification Search
CPC ................ G01C 21/3635; G01C 21/18; G01C 21/3667; G06T 19/003
See application file for complete search history.

(56) References Cited

U.S. PATENT DOCUMENTS

| | | | |
|---|---|---|---|
| 10,732,004 B2 | 8/2020 | Jung et al. | |
| 10,735,922 B1 | 8/2020 | Andrews et al. | |
| 2018/0080774 A1* | 3/2018 | Sink | G06F 3/012 |
| 2019/0137294 A1* | 5/2019 | Jung | G06T 19/006 |
| 2020/0236507 A1 | 7/2020 | Manolakos et al. | |
| 2020/0238825 A1 | 7/2020 | Lerzer et al. | |
| 2020/0238929 A1 | 7/2020 | Wippler | |
| 2020/0353952 A1* | 11/2020 | Suzuki | G08G 1/166 |
| 2021/0034869 A1* | 2/2021 | Desai | G06F 16/29 |

* cited by examiner

*Primary Examiner* — Mathew Franklin Gordon
(74) *Attorney, Agent, or Firm* — Brooks, Cameron & Huebsch, PLLC

(57) ABSTRACT

Methods and devices and systems related to a computing device for providing a route with augmented reality (AR) are described. An example method can include receiving, at a computing device, a trigger associated with a first location of the computing device, tracking movement of the computing device relative to the first location, and providing a route back to the first location from a second location reached during the tracked movement. The route can include displayed AR.

20 Claims, 3 Drawing Sheets

PROVIDING A ROUTE WITH AUGMENTED REALITY

TECHNICAL FIELD

The present disclosure relates generally to a computing device, and more particularly, to methods, apparatuses, and systems related to augmented reality (AR).

BACKGROUND

A computing device can be, for example, a personal laptop computer, a desktop computer, a smart phone, a tablet, a wrist-worn device, a digital camera, a robot vacuum cleaner, a computing device within an automobile, a headset (e.g., virtual reality/AR), and/or redundant combinations thereof, among other types of computing devices.

AR can overlay virtual objects on a real-world (e.g., natural) environment. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment.

DETAILED DESCRIPTION

Figure 1:
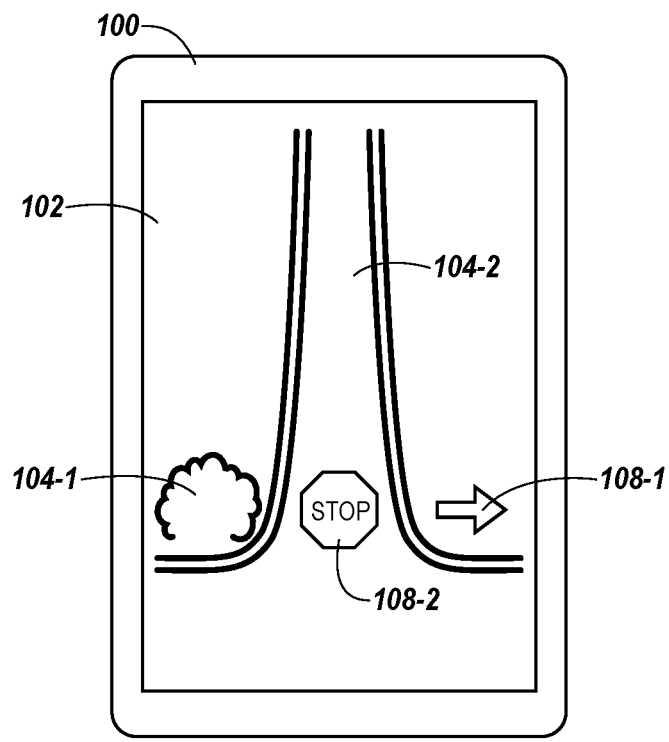
FIG. 1 illustrates an example of a user interface of a computing device for providing a route with augmented reality (AR) in accordance with a number of embodiments of the present disclosure.

Navigation applications used on computing devices may use global positioning system (GPS) technology by locating radio signals from a network of GPS satellites to calculate a position on the earth's surface. A user of the computing device is able to receive directions from a first address to a different address via a descriptive route following roadways, for instance. However, the user may not be able to receive directions from a first location without a physical address, such as a parking spot in a parking lot, to a second location (with or without a physical address). As used herein, a physical address includes a street address (e.g., a mailing address).

In contrast, examples of the present disclosure include methods, apparatuses, and systems related to providing a route with AR. An example method includes receiving, at a computing device, a trigger associated with a first location of the computing device, tracking movement of the computing device relative to the first location, and providing a route back to the first location from a second location reached during the tracked movement. The route can include displayed AR.

A trigger can include, but is not limited to, a request to launch an AR camera, a request to launch an AR application, a location of the computing device, or a change in speed of the computing device, among others. The location and or change in speed (e.g., change in acceleration) of the computing device can be determined using an accelerometer, a gyroscope, a global positioning system (GPS), a wi-fi network, or a social media application, among others. The route can be non-descriptive such that it does not follow roadways, walking paths, etc. AR may be displayed via the user interface and can guide the user along a descriptive or non-descriptive route from the first location to the second location and back to the first location.

As used herein, "a number of" something can refer to one or more of such things. For example, a number of computing devices can refer to one or more computing devices. A "plurality" of something intends two or more. Additionally, designators such as "Y", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a user interface 102 of a computing device 100 for providing a route with augmented reality (AR) in accordance with a number of embodiments of the present disclosure. The user interface 102 can be generated by the computing device 100. The user interface 102 can be a graphical user interface (GUI) that can provide and/or receive information to and/or from the user of the computing device 100. The user interface 102 can be shown on a display of the computing device 100. In some examples, the display can be a touchscreen.

The computing device may be a smartphone, tablet, or other device having a camera or cameras and AR capabilities. In a number of embodiments, AR can be used through location services (e.g., GPS, gyroscope, accelerometer, etc.), one or more of the cameras (e.g., camera 328 in FIG. 3 or camera 428 in FIG. 4), or a combination thereof. In some examples, one of the cameras can be used solely for AR purposes (e.g., an AR-specific camera). In a number of embodiments, one or more optical sensors can be used with one or more cameras for the AR or, in contrast, one or more optical sensors can be used instead of one or more cameras for the AR.

In some examples of the present disclosure, a user may desire a route back to a first location (e.g., parked car, home appliance, internet-of-things device) that does not have a physical address. For instance, a user may desire to know how to get back to his or her car in a large parking lot or parking ramp. In such an example, no physical address exists, so the user cannot enter the address into a navigation application from a different location to find his or her way back to the car. In addition, a user may travel to more than one location from the first location and following the same route in reverse from location-to-location may be inefficient and/or undesirable.

In some examples, the computing device 100 can receive a trigger to launch an AR application on the computing device and can launch the AR application in response. For instance, a user may launch the AR application on the computing device 100, the user may launch an AR-specific camera on the computing device, or the computing device may detect a change in speed of the computing device (e.g., a change in acceleration) and launch the AR application under the assumption that the user has gone from a moving state (e.g., driving) to a stopped state (e.g., parked).

Launching the AR application, in some instances, can include the user viewing his or her physical environment along with AR via smart glass (e.g., viewing the AR on the windshield of a car display), viewing AR via a display of a computing device (e.g., a smartphone display, tablet display, personal computer display, etc.), or viewing AR via a head set. The AR may appear to an avatar or other non-real items displayed within the real world. For instance, a user may see a parking lot with several cars, which are actually present in the parking lot, but they may also view an avatar representing the user or an arrow indicating a direction in which the user should proceed. Neither the avatar nor the arrow is present in the real world.

Put another way, launching the AR application can result the physical location of the user being viewable, and the user can view a rendering of digital images or data onto real-world objects. For instance, superimposed digital information can be overlaid on the user's view of a physical environment. The digital information cab be tailored to the user's physical position and context of the task (e.g., determining a route, tracking movement, etc.), thereby helping the user to complete the task. Unlike virtual reality, AR is not a simulation of reality, rather it integrates and adds to a user's interaction with the real world.

Once the AR application is launched, the computing device can track movement of the computing device relative to the first location (e.g., the car). This can be done using GPS, an accelerometer, a gyroscope, or any combination thereof, among others. For instance, a user may travel from his or her car to work and then to a restaurant. These movements can be tracked. When the user is ready to return to the first location (e.g., his or her car), a route can be provided based on the tracked movement. The route can include displayed AR. In some examples, tracking the movement can be performed with respect to a user-defined main platform. For instance, a user may choose his or her smartphone as a most-frequently used computing device and choose this computing device for automatic tracking.

AR can overlay virtual objects on a real-world environment to mask a portion of the real-world environment and/or add to the real-world environment such that it is perceived as an immersive aspect of the real-world environment. In some examples, AR can display and/or automate a number of images and/or enhance an AR image to move and/or change on the user interface 102.

In an example, a user may be returning to his or her parked car using a route displayed on the user interface 102. The route may include passing through a park to get to the parked car from the restaurant. This may be a different route than the route previously taken to work and then the restaurant. As the user walks back to his or her parked car, the user interface 102 displays the route including real objects such as the bush 104-1 and the park path 104-2 and also displays AR such as the right arrow 108-1 and the stop sign 108-2. The AR can guide the user to stop before proceeding further down the park path 104-1 (e.g., via the stop sign 108-2) and instruct the user to turn right (e.g., via the right arrow 108-1). The route may be at least in part non-descriptive because it leads the user down a park path and through a parking lot to a specific parking spot without a physical location and without following named streets, for instance. A non-descriptive route may also include a route that can be displayed using AR, but not described in words. For instance, the route may not be describable as, "take a left on second street in 300 feet", but is instead better displayed using AR.

In some examples, the computing device 100 is communicatively coupled to a different computing device for which a route is provided. As used herein, "communicatively coupled" can include coupled via various wired and/or wireless connections between devices such that data can be transferred in various directions between the devices. The coupling need not be a direct connection, and in some examples, can be an indirect connection.

For instance, the computing device 100 may receive a trigger to launch an AR application when connection of the different computing device is detected. The different computing device, for instance, may be a drone. The drone may include a camera, and the user interface 102 can display what the drone's camera sees, as well as AR to help the user guide the drone to a desired location. For instance, if the drone is to deliver a package to an individual at a location without a physical address or to a specific location (e.g., a backyard of a home). For instance, an individual may not want a package delivered to his or her front door, but instead to a fenced backyard, for security purposes. The drone operator may view the route via the user interface 102 and guide the drone to the desired location.

Figure 2:
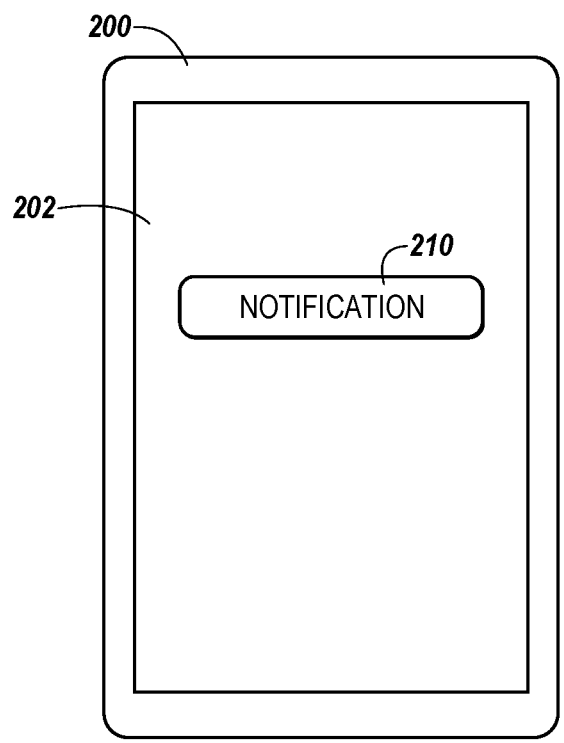
FIG. 2 illustrates an example of a user interface of a computing device for providing a route with AR including a notification in accordance with a number of embodiments of the present disclosure.

FIG. 2 illustrates an example of a user interface 202 of a computing device 200 for providing a route with AR including a notification 210 in accordance with a number of embodiments of the present disclosure. Along with displayed route and visual indicators discussed with respect to FIG. 1, other notifications may be used to direct the user down the correct route. For instance, the computing device 200 may vibrate when an instruction is upcoming, or the computing device 200 may give a verbal instruction to "stop and turn right" while displaying the image displayed on the user interface 102 of FIG. 1. A computing device communicatively coupled to the computing device 200 may also indicate directions; for instance, a smartwatch can vibrate on a particular side based on the direction a user is instructed to turn (e.g., vibrate on the right side of the watch for a right turn).

Notifications, such as the notification 210 may be customized for users with particular needs. For instance, a user with visual impairments may receive verbal instructions along with the AR displayed on the user interface 202. A user with hearing impairments may receive additional visual instructions such as a flashing screen with or without words indicating a route instruction. Physical notifications such as vibrations may indicate instructions, as well. Any combination of the aforementioned notifications, whether custom or not, may be used to indicate route instructions. For instance, a user may choose particular settings based on his or her preferences.

Figure 3:
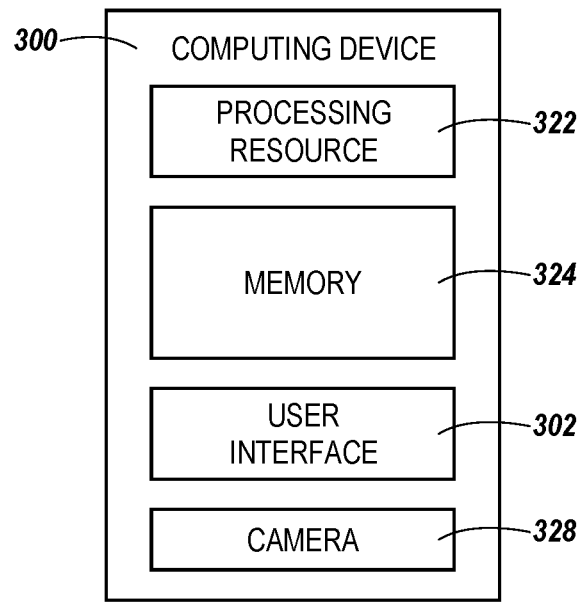
FIG. 3 illustrates an example of a computing device used for providing a route with AR in accordance with a number of embodiments of the present disclosure.

FIG. 3 illustrates an example of a computing device 300 used for providing a route with AR in accordance with a number of embodiments of the present disclosure. The computing device 300 can be an apparatus. As illustrated in FIG. 3, computing device 300 can include a processing resource (e.g., processor) 322, a memory 324, a user interface 302, and a camera 328. The computing device 300 can be, for example, a personal laptop computer, a desktop computer, a smart phone, a tablet, a wrist-worn device, a digital camera, and/or redundant combinations thereof, among other types of computing devices.

The memory 324 can be any type of storage medium that can be accessed by the processing resource 322 to perform various examples of the present disclosure. For example, the memory 324 can be a non-transitory computer readable medium having computer readable instructions (e.g., computer program instructions) stored thereon that are executable by the processing resource 322 to receive a trigger at the apparatus to launch a plurality of AR applications when the apparatus is in a first location. The trigger, for instance, is received from the camera, a GPS of the apparatus, an accelerometer of the apparatus, a gyroscope of the apparatus, a sensor of the apparatus, or a combination thereof. The launching of a camera (e.g., general or AR-specific); a location or speed change indication from the GPS, the accelerometer, or the gyroscope; the sensor indicating a route creation is desired; the receipt of a request to launch an AR application; or a combination thereof can be triggers. The instructions can be further executable to launch the plurality of AR applications, track a location of the apparatus as it travels from the first location to a second location, and provide a route from the second location to the first location using the launched plurality of AR applications.

For instance, a user may be at a park bench when he or she receives an invitation to meet a friend for coffee. The user may desire to return to the park bench after coffee. In such an example, the user can launch an AR application on his or her computing device, which serves as a trigger. The location of the user's computing device is tracked as it travels from the first location (e.g., park bench) to the second location (e.g., coffee shop). Following coffee, the user is provided with a route back to the park bench, for instance if he or she has forgotten the exact location of the park bench or if he or she desires a different route back. For example, the route from the second location to the first location may be different than a reverse route traveled by the apparatus from the first location to the second location. The route may be descriptive, non-descriptive, or a combination thereof, and can include AR that guides the user back to the park bench. For instance, as the user views real images on the user interface 302, AR can be displayed instructing the user of upcoming turns, obstacles, etc. In some examples, the AR may include a virtual path to follow.

The memory 324, in some instances, can be a non-transitory computer readable medium having computer readable instructions stored thereon that are executable by the processing resource 322 to track a location of the apparatus from the second location to a third location and provide a route from the third location to the first location using the launched plurality of AR applications. For instance, in the previous example, the user may travel from the coffee shop (e.g., second location) to a grocery store (e.g., third location), and then desire to return to the park bench (e.g., first location). A route is provided from the grocery store to the park bench via the user interface 302, with AR guiding the user via a path or other instructions. The route from the third location to the first location may be different than a reverse of the route from the first location to the second location and the third location.

In some examples, the user may be notified of route instructions via visual, verbal (e.g., audible), or physical notifications. The notifications may be made via the computing device or a different computing device. For instance, the instructions can be executable to instruct a wearable device communicatively coupled to the apparatus to provide a physical indication, verbal indication, and/or a visual indication of a route instruction to a wearer of the wearable device. For instance, the wearable device (e.g., a smartwatch, smart glasses, fitness tracker, etc.) may vibrate when a new AR appears or when a user is receiving a direction. The wearable device may emit a verbal command such as, "turn left here" to accompany the AR on the display of the user interface 302. In some instances, the wearable device also has a user interface that can display the AR or a notification such as "left" when the user is to turn left. The wearable device may use any combination of the indications, among others. While a wearable device is described herein, other computing devices may be communicatively coupled to the computing device and receive indications. For instance, if the computing device is a smartphone, and the user has a communicatively coupled tablet in his or her briefcase, the tablet may also provide indications of route instructions.

In some examples, the processing resource 322 can be further configured to execute executable instructions stored in the memory 324 to receive a trigger to launch a plurality of AR applications when a different computing device communicatively coupled to the computing device is in a first location, launch the plurality of AR applications on the computing device, track a location of the different apparatus, provide a route to a second location for the different computing device using the launched plurality of AR applications, and display the route including AR via the user interface. For instance, the different computing device may include a drone. A computing device may receive an indication that the drone is in a particular location (e.g., prepared for delivery), and AR applications may be launched. The drone may have a camera and tracking capabilities (e.g., GPS, gyroscope, accelerometer, etc.). Using the tracking capabilities of the drone, the computing device can track the drone's location, view what the drone receives at its camera, and display a route to a particular location including AR. For instance, a drone operator can instruct the drone where to go based on the route with AR provided on the computing device. Put another way, the instructions can be executable to remotely control the different computing device (e.g., drone) to travel to the second location using the route. In some instances, the second location does not have a physical location (e.g., on a deck of a home).

The memory 324 can be volatile or nonvolatile memory. The memory 324 can also be removable (e.g., portable) memory, or non-removable (e.g., internal) memory. For example, the memory 324 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 324 is illustrated as being located within computing device 300, embodiments of the present disclosure are not so limited. For example, memory 324 can be located on an external computing resource (e.g., enabling computer readable instructions to be downloaded over the Internet or another wired or wireless connection).

As illustrated in FIG. 3, computing device 300 includes a user interface 302. A user (e.g., operator) of computing device 300, can interact with computing device 300 via a user interface 302 shown on a display. For example, the user interface 302 via a display can provide (e.g., display and/or present) information to the user of computing device 300, and/or receive information from (e.g., input by) the user of computing device 300. For instance, in some embodiments, the user interface 302 can be a GUI that can provide and/or receive information to and/or from the user of computing device 300. The display showing the user interface 302 can be, for instance, a touchscreen (e.g., the GUI can include touchscreen capabilities).

Figure 4:
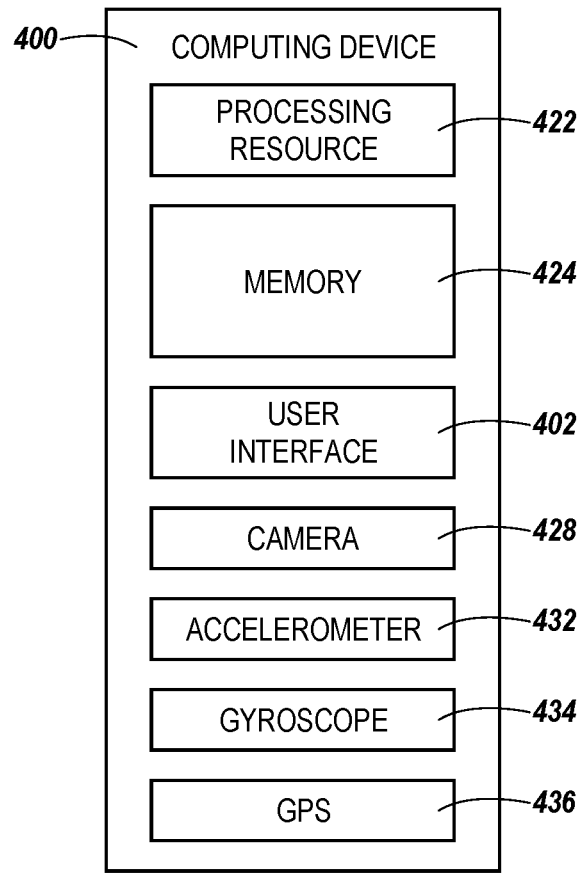
FIG. 4 illustrates another example of a computing device used for providing a route with AR in accordance with a number of embodiments of the present disclosure.

FIG. 4 illustrates another example of a computing device 400 (e.g., an apparatus) used for providing a route with AR in accordance with a number of embodiments of the present disclosure. Computing device 400 can correspond to computing device 300 in FIG. 3. Computing device 400 can include a processing resource 422, a memory 424, a user interface 402, and a camera 428. The processing resource 422, the memory 424, the user interface 402, and the camera 428 can correspond to the processing resource 322, the memory 324, the user interface 302, and the camera 328, respectively in FIG. 3. As illustrated in FIG. 4, computing device 400 can further include an accelerometer 432, a gyroscope 434, and a GPS 436.

The accelerometer 432, the gyroscope 434, and/or the GPS 436 can be located on the computing device 400, as illustrated in FIG. 4, or external to the computing device 400. A location and/or change in acceleration or speed of the computing device 400 can be determined via the accelerometer 432, the gyroscope 434, and/or the GPS 436.

Figure 5:
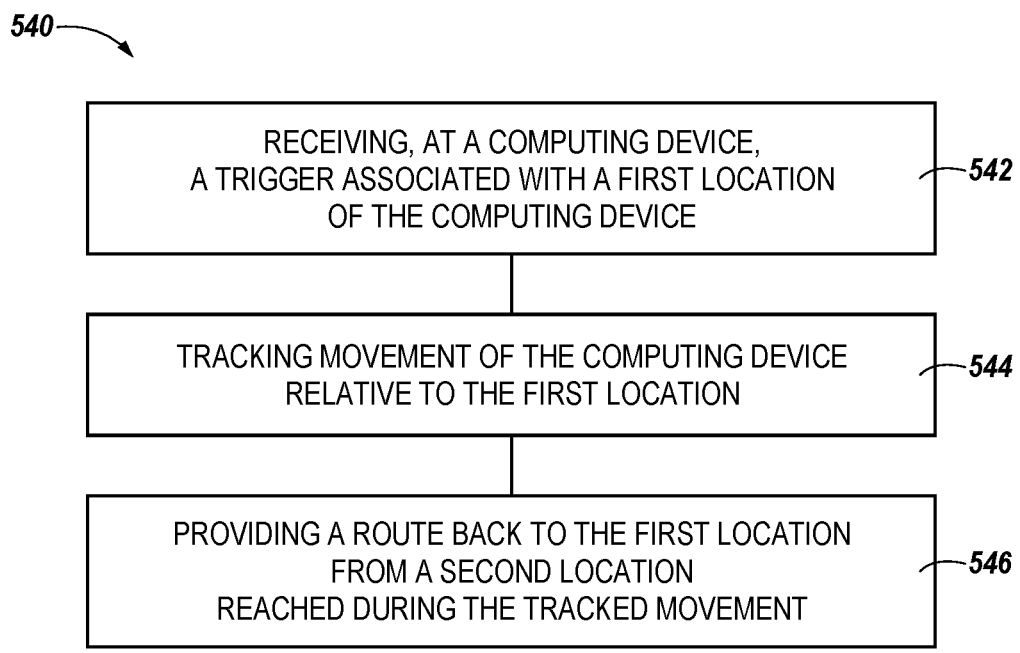
FIG. 5 is a flow diagram of a method for providing a route with AR in accordance with a number of embodiments of the present disclosure.

FIG. 5 is a flow diagram of a method 540 for providing a route with AR in accordance with a number of embodiments of the present disclosure. The method 540 can be performed, for instance, using a computing device such as computing device 300 or 400 described with respect to FIGS. 3 and 4.

At 542, the method 540 includes receiving, at a computing device such as a mobile device (e.g., a portable computing device such as a smartphone or tablet), a trigger associated with a first location of the computing device. Receiving the trigger can include, for instance, receiving a request to launch an AR application on the computing device, receiving a request to launch an AR camera on the computing device, or receiving a particular change in acceleration forces of the computing device, among others. For instance, a trigger exists when a user indicates they want to launch AR (e.g., via an application or a camera) to provide a route or when the computing device changes speed, indicating a stop, such as a parked car. In some examples, an AR application is launched on the computing device responsive to receipt of the trigger. The AR application or applications can allow for AR guidance when a route back to a particular location is desired.

At 544, the method 540 includes tracking movement of the computing device relative to the first location. Using GPS, an accelerometer, or a gyroscope, among others, the location of the computing device can be tracked, allowing for a route back to a particular location to be determined. In some examples, the first location and/or the second location does not have a physical address. For instance, a car parked in a mall parking lot does not have a physical address, so a descriptive route to or from the parking lot (e.g., using street names) may not be possible.

The method 540, at 546, includes providing a route back to the first location from a second location reached during the tracked movement. The route, for instance, includes displayed AR (e.g., via a display of a mobile device) that can instruct a user how to get back to the first location (e.g., via a non-descriptive route). The route can be provided, in some instances, via alerts to the computing device and/or to a different computing device associated with the computing device. For example, the user may receive vibrations, verbal commands, or visible instructions via the computing device, or a wearable device associated with the computing device when route instructions occur.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
  receiving, at a mobile device, a trigger associated with a first location of a computing device;
  launching an augmented reality (AR) application on the mobile device responsive to receipt of the trigger;
  tracking movement of the mobile device relative to the first location using a global positioning system of the mobile device, an accelerometer of the mobile device, or a gyroscope of the mobile device, or any combination thereof; and
  providing a route back to the first location from a second location reached during the tracked movement,
    wherein the route comprises displayed AR within a physical environment of the route back via the AR application and a display of the mobile device; and
    wherein the route at least partially comprises a non-descriptive route that does not follow a roadway.

2. The method of claim 1, wherein receiving the trigger comprises receiving a request to launch an AR camera on the mobile device.

3. The method of claim 1, wherein receiving the trigger comprises receiving a particular change in acceleration forces of the mobile device.

4. The method of claim 1, further comprising receiving the trigger associated with a first location that does not have a physical address.

5. The method of claim 1, further comprising providing the route via alerts to the mobile device.

6. The method of claim 1, further comprising providing the route via alerts to a different computing device associated with the mobile device.

7. An apparatus, comprising:
a camera;
a user interface;
a memory; and
a processor configured to execute executable instructions stored in the memory to:
  receive a trigger at the apparatus to launch a plurality of augmented reality (AR) applications when the apparatus is in a first location;
  launch the plurality of AR applications;
  track a location of the apparatus as it travels from the first location to a second location; and
  provide a route from the second location to the first location using the launched plurality of AR applications, wherein:
    wherein the route comprises displayed AR within a physical environment of the route to the second location via the plurality of AR applications and a display of the apparatus; and
    wherein the route at least partially comprises a non-descriptive route that does not follow a roadway.

8. The apparatus of claim 7, further comprising the instructions executable to:
  track a location of the apparatus from the second location to a third location; and
  provide a route from the third location to the first location using the launched plurality of AR applications.

9. The apparatus of claim 7, further comprising the instructions executable to receive the trigger from the camera, a global positioning system (GPS) of the apparatus, an accelerometer of the apparatus, a gyroscope of the apparatus, a sensor of the apparatus, or a combination thereof.

10. The apparatus of claim 7, wherein the route from the second location to the first location is different than a reverse route traveled by the apparatus from the first location to the second location.

11. The apparatus of claim 7, wherein the instructions executable to provide a route comprise instructions executable to instruct a wearable device communicatively coupled to the apparatus to provide a physical indication of a route instruction to a wearer of the wearable device.

12. The apparatus of claim 7, wherein the instructions executable to provide a route comprise instructions executable to provide a verbal indication of a route instruction.

13. The apparatus of claim 7, wherein the instructions executable to provide a route comprise instructions executable to provide a visual indication of a route instruction via the user interface.

14. The apparatus of claim 7, wherein the route is a non-driving route.

15. An apparatus, comprising:
a camera;
a user interface;
a memory; and
a processor configured to execute executable instructions stored in the memory to:
  receive a trigger to launch a plurality of augmented reality (AR) applications when a different apparatus communicatively coupled to the apparatus is in a first location;
  launch the plurality of AR applications on the apparatus;
  track a location of the different apparatus;
  provide a route to a second location for the different apparatus using the launched plurality of AR applications; and
  display the route including AR via the user interface, wherein:
    the route comprises displayed AR within a physical environment of the route to the second location via the plurality of AR applications; and
    the route at least partially comprises a non-descriptive route that does not follow a roadway.

16. The apparatus of claim 15, further comprising the instructions executable to remotely control the different apparatus to travel to the second location using the route.

17. The apparatus of claim 16, wherein the different apparatus is a drone.

18. The apparatus of claim 17, wherein the second location does not have a physical address.

19. The method of claim 1, wherein the route is a non-driving route.

20. The apparatus of claim 1, wherein the route is a non-driving route.

* * * * *